United States Patent [19]

Kakimoto

[11] 4,383,679

[45] May 17, 1983

[54] DAMPER FOR SUSPENSION OF AN ENGINE

[75] Inventor: Toshihiko Kakimoto, Tokyo, Japan

[73] Assignee: Nissan Motor Co., Ltd., Yokohama, Japan

[21] Appl. No.: 251,455

[22] Filed: Apr. 6, 1981

[30] Foreign Application Priority Data

Apr. 14, 1980 [JP] Japan .................................. 55-48987

[51] Int. Cl.³ .............................................. F16F 1/36
[52] U.S. Cl. .................. 267/8 R; 267/140.1; 267/153; 248/562; 248/634
[58] Field of Search ............... 188/268, 275, 298, 313, 188/378, 379, 280, 322.15; 248/562, 634, 636, 638; 267/75, 8 R, 113, 134, 140.1, 141, 153, 35, 122, 123; 137/513.3, 517, 519, 854, DIG. 4

[56] References Cited

U.S. PATENT DOCUMENTS

| | | | |
|---|---|---|---|
| 2,252,772 | 8/1941 | Katcher | 188/280 |
| 2,310,570 | 2/1943 | Briggs | 188/280 |
| 2,345,164 | 3/1944 | White | 188/280 |
| 2,387,066 | 10/1945 | Harding | 267/134 |
| 2,467,098 | 4/1949 | Rossman | 188/322.15 |
| 2,579,058 | 12/1951 | Trimble et al. | 188/280 |
| 4,159,091 | 6/1979 | Le Salver et al. | 248/634 |

FOREIGN PATENT DOCUMENTS

| | | |
|---|---|---|
| 838403 | 8/1951 | Fed. Rep. of Germany . |
| 2833776 | 1/1980 | Fed. Rep. of Germany . |
| 642711 | 9/1928 | France . |
| 2168680 | 8/1973 | France . |
| 579538 | 7/1958 | Italy .................. 137/854 |
| 2033534 | 5/1980 | United Kingdom . |
| 2041485 | 9/1980 | United Kingdom ......... 267/140.1 |

Primary Examiner—Douglas C. Butler
Assistant Examiner—R. R. Diefendorf
Attorney, Agent, or Firm—James Creighton Wray; Craig B. Bailey

[57] ABSTRACT

A damper comprises a plurality of armatures between which an elastic block is interposed. A partition plate divides the interior bore of the elastic block into two chambers. The chambers are filled with a working fluid and communicate with each other through an orifice providing a restricted flow communication and also through holes providing an unrestricted flow communication. A valve is provided to close the holes to prevent the unrestricted flow communication.

12 Claims, 6 Drawing Figures

DAMPER FOR SUSPENSION OF AN ENGINE

BACKGROUND OF THE INVENTION

1. Field of the Invention

The present invention relates to a damper and more particularly to a damper for suspension of an engine on a vehicle structure.

2. Description of the Prior Art

There is illustrated in FIGS. 1 and 2 a conventional damper of an engine mount which comprises a plurality of armatures 1, 2, one of which being connected to an engine and the other being connected to a vehicle structure such as a frame. A tubular elastic block of elastomer 3 is interposed between and fixedly attached to these armatures 1, 2, and within a bore defined by the armatures 1, 2 and the block 3, two chambers A, B are formed which are filled with a working fluid and communicate with each other through a hole 4 serving as an orifice. A partition plate 5 between said chambers A, B has its periphery rimmed with a rubber 7 and disposed movably within in a space between a shoulder 6a formed on the base plate 1 and a stop 6. The second chamber B defined above the partition plate 5 has its upper end sealably closed by a diaphragm 8 which is fixed by a pressure plate 9 on the armature 1.

The armature 2 is attached by a fixed bolt to the vehicle structure and the armature 1 is attached to the engine together with the pressure plate 9.

The damper dampens a vibration of the engine by converting the engine vibration into a change in volume of the first chamber A within the block 3 and suppressing a resulting change in pressure occurring within the chamber A by allowing restricted flow communication with the chamber B through the hole 4 of the partition plate 5. During this operation the partition plate 5 moves upwardly and downwardly between the shoulder 6a and the stop 6 in response to the pressure difference between both of the chambers A, B. In the case of small vibrations which result in the change in volume of the chamber A which can be followed by this upward and downward movements, the hole 4 formed through said partition plate 5 does not perform the dampening function. During this operation, the dampening of vibration is performed by the elastic deformation of the elastic block 3, only.

For proper operation of the damper illustrated in FIG. 1, the partition plate 5 itself must be of a sufficient thickness to withstand a pressure difference between the both chambers A and B and an orifice tube 10 should be attached to the partition plate 5 in such a manner as indicated by an imaginary line to enhance the orifice effect if the orifice effect by the hole 4 is found to be unsatisfactory, resulting in an increase in the inertia of the partition plate 5. This causes a problem in that the increased inertia prevents the partition plate 5 from moving in response to a pressure difference between the both chambers A and B which occurs in response to small vibrations of the engine. Another problem is that the workability in assembly of the partition plate is poor because it is to be assembled with the rubber 7 and stop 6.

Referring to FIG. 2, a second conventional damper is explained. This damper comprises two armatures 1a, 1b, and another two armatures 2a, 2b arranged above and below said armatures 1a, 1b, respectively. Elastic blocks 3a, 3b of elastomer are interposed respectively between the base plates 1a, 2a and between the base plates 1b, 2b.

Two chambers A, B are formed within the elastic blocks 3a, 3b, filled with a working fluid and communicating with each other through a hole 4 serving as an orifice. A partition plate 5 defines chamber A, B. The armatures 2a, 2b are fixedly clamped to each other by an elongate bolt 11, which elongate bolt 11 extends through the hole 4 of the partition plate 5, so that the effective area of the hole 4 serving as the orifice is defined by a ring rubber 12 mounted on the partition plate 5 and the elongate bolt 11. The outer periphery of the partition plate 5 is movably disposed within a space between said armatures 1a, 1b, the space having a distance h. This damper operates in substantially the same manner as that of FIG. 1.

The damper shown in FIG. 2 suffers from the same problem as that shown in FIG. 1. The problem is in that the inertia of the partition plate 5 is so large that it can not respond well to small vibrations of an engine because of the necessity of sufficient thickness of the partition plate 5 for withstanding a great pressure difference between the both chambers A, B and because of the provision of the ring rubber 12. Another problem derived from the complicated configuration of the armatures 1a, 1b, 2a, 2b is that a great degree of accuracy in assembly is required to provide the desired dimension h and sufficient sealing effectiveness between the elastic blocks 3a, 3b and the partition plate 5.

SUMMARY OF THE INVENTION

According to the present invention, a damper includes a fixed partition plate defining on one side a first chamber and on the opposite side a second chamber. An unrestricted flow communication between both of the chambers is established through hole means associated with valve plates which are disposed in the first and second chambers, respectively. A restricted flow communication is established through orifice means. Each of the valve plates is responsive to a difference in pressure between the pressure in the working fluid within the first chamber and the pressure in the working fluid within the second chamber. One of the valve plates closes the hole means when the difference in pressure is high. Thus, under these circumstances, the orifice means plays a role in allowing the passage of the working fluid between both of the chambers thus dampening the applied vibrations.

An object of the present invention is to provide a damper which is free from the above problems and which is provided with an improved performance in dampening small vibrations.

BRIEF DESCRIPTION OF THE DRAWINGS

The features and advantages of the arrangement of the present invention will become more clearly appreciated from the following description taken in conjunction with the accompanying drawings in which like reference numerals denote corresponding elements, and in which.

DETAILED DESCRIPTION OF THE INVENTION

Figure 1:
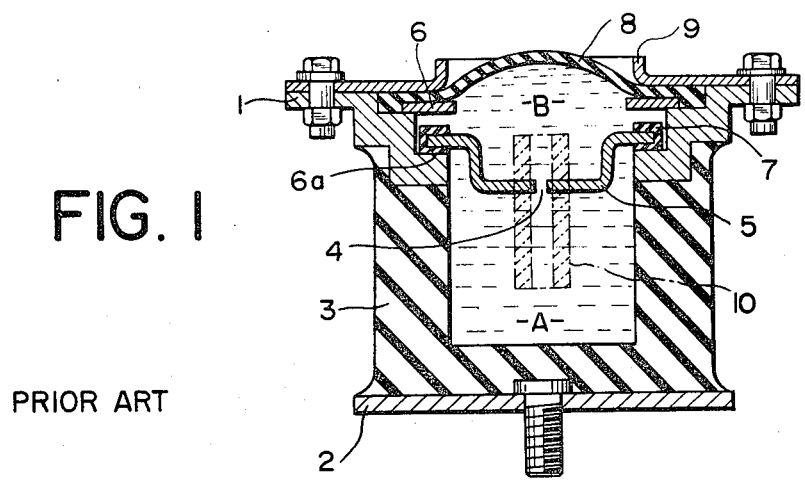
FIG. 1 is a longitudinal section showing the first conventional damper described above.
Figure 2:
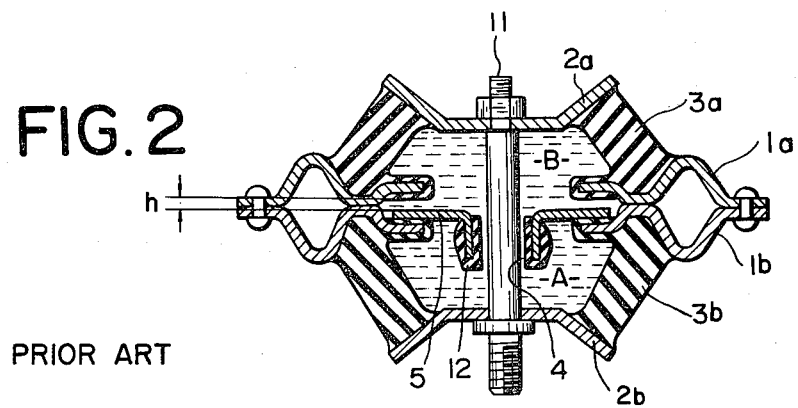
FIG. 2 is a longitudinal section showing the second conventional damper described above.
Figure 3:
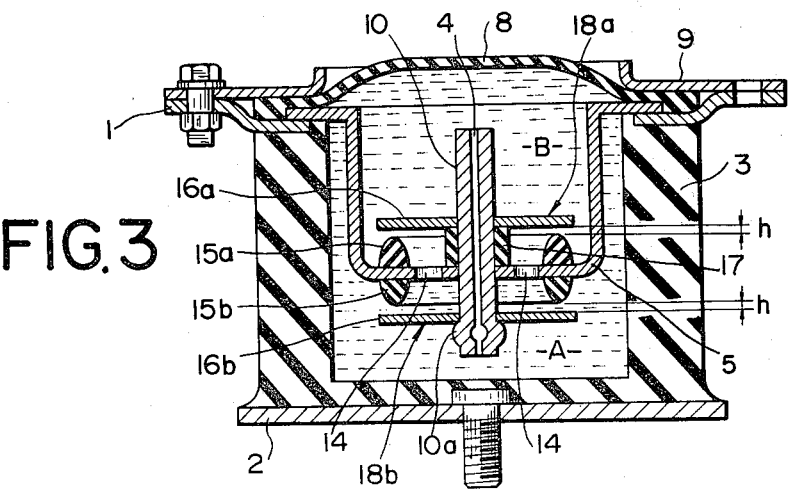
FIG. 3 is a longitudinal section of a first embodiment of a damper according to the present invention.

Turning now to the drawings and more specifically to FIG. 3, a first embodiment according to the present invention is shown. As shown in FIG. 3, a damper comprises armatures 1, 2, wherein the armature 1 is fixedly connected to an engine (not shown) and the armature 2 is fixedly connected to a vehicle structure (not shown), such as a vehicle body frame. A tubular elastic block 3 of an elastomer is interposed between both of the armatures 1, 2. The armatures 1, 2 and elastic block 3 cooperate to define a bore. A partition plate 5 is fixed to the armature 1 to divide the bore into two chambers A, B. The partition plate 5 has an orifice tube 10 fixedly attached thereto to extend through a center portion thereof to provide a restricted flow communication between both of the chambers A, B. The partition plate 5 is formed with communicating holes 14, 14. Ring shaped rubber seat 15a, 15b are fixedly attached to upper and lower surfaces of the partition plate 5 in a manner to surround the communicating holes 14, 14. Arranged above the upper end surface of the seat 15a is a thin valve plate 16a. The thin valve plate 16a is axially slidably mounted on the orifice tube 10 and is supported relative to the partition plate 5 by an elastomer 17 and is spaced a distance h from the seat 15a. Arranged below the bottom end surface of the seat 15b is a thin valve plate 16b. The thin valve plate 16b is axially slidably mounted on the orifice tube 10 and is supported by an emboss 10a and is spaced a distance h from the seat 15b. Thus, the seats 15a, 15b and the thin valve plates 16a, 16b cooperate with each other to form valves 18a, 18b for the communicating holes 14, 14. 4 designates an orifice hole formed through the orifice tube.

A diaphragm 8 is pressed against the upper end surface of the elastic block 3 by a pressure plate 9, thus defining the chamber B. The chambers A, B are filled with a working fluid.

The damper operates as follows:

The elastic block 3 resiliently suspends the engine on the vehicle structure. Although the block 3 elastically deforms in response to such small vibrations of the engine as to cause volume changes in the chambers A, B, since the thin valve plates 16a, 16b moving in response to such volume changes do not come into contact with the seats 15a, 15b, the working fluid is allowed to flow through the communicating holes 14 in two ways between the chambers A, B. Because, under this circumstance, the working fluid does not flow through the orifice hole 4 of the orifice tube 10, the interior pressures within the chambers A, B balance so that the transmitting force to the vehicle body of the vibration is dampened by the elastic deformation of the elastic block 3, alone.

During the occurence of vibrations having great amplitudes caused by roughness of a road surface, the volume change within each of the chambers A, B is large, thus causing a large pressure difference between the both chambers A, B. For example, when a load large enough to raise the armature 2 is imposed on the damper, the elastic block 3 is compressed from its lower end, causing a high pressure rise in the working fluid within the chamber A. Then, the working fluid within the chamber A tends to flow through the communicating holes 14, 14 toward the chamber B, but the thin valve plate 16b moves to abut with the seat 15b due to the force of the working fluid, thus causing the valve 18b to close the communicating holes 14, 14. Thus, the working fluid within the chamber A must flow through the orifice hole 4 of the orifice tube 10 toward the chamber B. Due to the passage of the working fluid through the orifice hole 4, the pressure rise within the chamber A is dampened.

When a load is imposed on the damper to cause the armature 2 to move downwardly, the elastic block 3 stretches downwardly, resulting in a pressure drop within the chamber A as compared to a pressure drop in the chamber B. This causes the thin valve plate 16a to move downwardly deforming the elastomer 17 to come into contact with the seat 15a, thus closing the valve 18a to close the communicating holes 14, 14. Under this circumstance, the orifice hole 4 of the orifice tube allows the working fluid to flow toward the chamber A, thus dampening the pressure variation in the chamber B.

Among all kinds of vibrations induced by the engine and/or induced by the other sources, a vibration having a great amplitude is converted into a change in volume in the chamber A, B disposed within the elastic block 3 and the variation in pressure in one of the chambers A, B caused by same is dampened by the passage of the working fluid through the orifice hole 4 of the orifice tube 10 toward the other one of the chambers B, A. Since the moving parts movable in response to the pressure variation within the chambers A, B are the thin valve plates 16a, 16b, the weight of these parts may be reduced.

Figure 4:
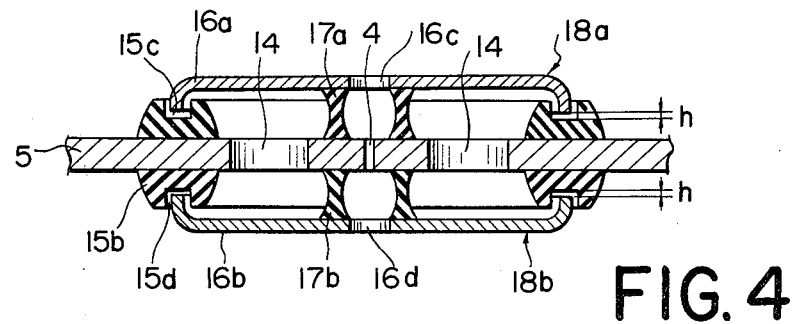
FIG. 4 is a fragmentary section of a second embodiment of a damper according to the present invention, showing a valve assembly.

Referring to FIG. 4, a second embodiment is shown, this embodiment being different from the first embodiment in the structure of valves 18a, 18b. As shown, the rims of thin valve plates 16a, 16b are curved toward the partition plate 5, and the seats 15a, 15b are formed with concave grooves 15c, 15d, to respectively receive the rims of the thin valve plates 16a, 16b with a distance h between the rim of each thin plate and the bottom of each concave groove. Both of the thin valve plates 16a, 16b are supported on the partition plate 5 by supporting elastomers 17a, 17b. The partition plate 5 is formed with an orifice hole 4 and communicating holes 14. This embodiment does not employ such an orifice tube 10 as one used in the previous embodiment. Therefore, this embodiment is suitable for the application wherein a low dampening characteristic is enough and there is not space to arrange such orifice tube 10. Of course, such orifice tube 10 may be employed, if desired. To provide the flow passage to the orifice hole 4 formed through the partition plate 5, the thin valve plates 16a, 16b are formed with central apertures 16c, 16d and the elastomers 17a, 17b surround the orifice hole 4 and the apertures 16c, 16d. The other structure and operation are substantially the same as the previous embodiment.

Figure 5:
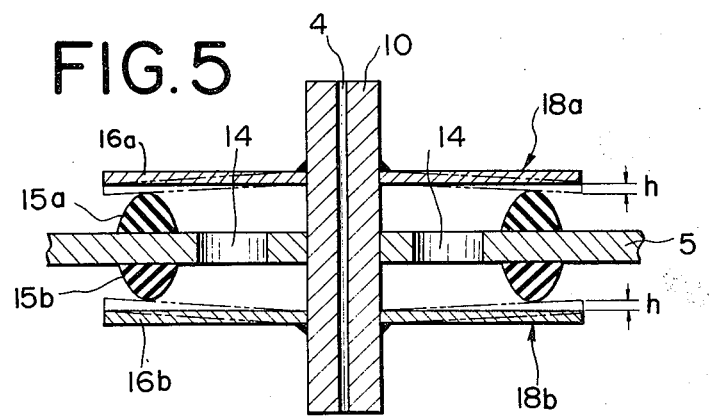
FIG. 5 is a similar view to FIG. 4 showing a third embodiment of a damper according to the present invention.

Referring to FIG. 5, a third embodiment is shown which is different from the FIG. 3 embodiment in that the thin valve plates 16a, 16b are fixed to an orifice tube 10 by means of caulking or press fitting or welding, and they are made of a material having an appropriate elasticity. The thin elastic valve plates 16a, 16b are flexed to the position shown by the phantom lines to close the communicating holes 14, 14 in response to the variation is pressure in the chambers A, B. The other structure and operation are substantially the same as that of the FIG. 3 embodiment.

Figure 6:
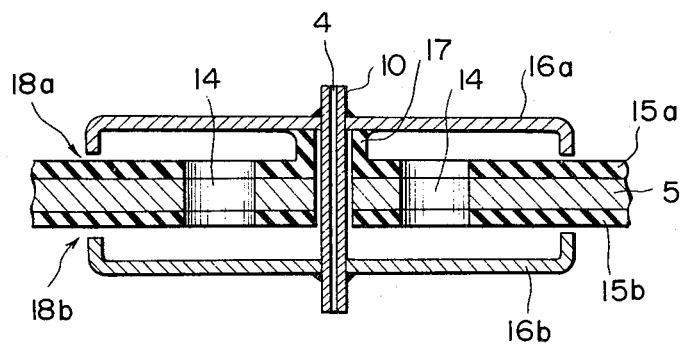
FIG. 6 is a similar view to FIG. 4 showing a fourth embodiment of a damper according to the present invention.

Referring to FIG. 6, a fourth embodiment is shown. In this embodiment, thin valve plates 16a, 16b are fixed to an orifice tube 10 by means of caulking or press fitting or welding, and the orifice tube 10 is mounted for slidable movement with respect to a partition plate 5 and they are supported on the partition plate 5 by means of an elastomer 17. As shown, valve seats 15a, 15b in the form of a sheet of an elastomer are fixedly attached to the opposite surfaces of the partition plate 5. In this case, if an orifice tube 10 is made of a light material, this embodiment can operate in the same manner as the other embodiments.

As described according to the present invention, the valve means is light in weight and has a small inertia so that it is sensitive and accurately responsive to a small difference in pressure across the partiton plate which is fixed to the armature.

The valve means is also a separate piece from the partition plate; and the setting of the timing of opening and closing of the valve means relative to the fluid pressure can be carried out accurately without any difficulty.

Moreover, the assembly of a damper according to the present invention is easy because of its simple structure.

What is claimed is:

1. A damper in particular for suspension of an engine on a vehicle structure, comprising
    first and second armatures one of which is fixedly connected to the engine, while the other one of which is fixedly connected to the vehicle structure;
    an elastic block having one end fixedly attached to said first armature and the opposite end fixedly attached to said second armature;
    said elastic block and said first and second armatures defining a bore extending from said one end of said elastic block to said opposite end thereof;
    a working fluid contained within said bore;
    a partition plate fixed to said second armature and projecting inwardly into said bore toward said one end of said elastic block to divide said bore into a first chamber between said partition plate and said one end of said elastic block and a second chamber between said partition plate and said opposite end of said elastic block;
    said partition plate having means defining an orifice providing a restricted flow communication between said first and second chambers; and
    a valve including at least one valve hole formed through said partition plate, said valve having a first valve seat fixedly attached to one side of said partition plate and enclosing said at least one valve hole and a second valve seat attached to the opposite side of said partition plate and enclosing said at least one hole, said valve having a first pressure responsive valve plate disposed within said first chamber and cooperating with said first valve seat and a second pressure responsive valve plate disposed within said second chamber and cooperating with said second valve seat, said first plate being normally disengaged from said first valve seat and being engaged with said first valve seat when the pressure in said working fluid contained within said first chamber is higher than the pressure in said working fluid contained within said second chamber by a predetermined amount, said second valve plate being normally disengaged from said second valve seat and being engaged with said second valve seat when the pressure in said working fluid contained within said second chamber is higher than the pressure in said working fluid contained in said first chamber by a predetermined amount.

2. A damper as claimed in claim 1, wherein said orifice defining means is in the form of an orifice tube fixedly attached to said partition plate to extend therethrough.

3. A damper as claimed in claim 2, wherein said first and second valve plates are axially slidably mounted on said orifice tube, and said valve includes means for holding said valve plates at a distance spaced from the cooperating valve seats.

4. A damper as claimed in claim 2, wherein said first and second valve plates are made of an elastic material and fixed to said orifice tube, each at a position axially spaced a distance from the cooperating one of said first and second valve seats.

5. A damper as claimed in claim 1, wherein said orifice defining means is in the form of an orifice, and wherein said first and second valve plates are resiliently supported by elastomers fixedly mounted on said partition plate in a manner to surround said orifice, said valve plates having central apertures, respectively, opening into the interior of said elastomers to communicate with said orifice formed through said partition plate, said valve seats being formed with concave grooves, respectively, said valve plates having their rims curved toward said cooperating valve seats and received by said corresponding concave grooves.

6. A damper as claimed in claim 1, wherein said orifice defining means is in the form of an orifice tube axially slidably mounted on said partition plate and wherein said valve plates are fixed to said orifice tube and resiliently supported by an elastomer fixedly mounted on said partition plate.

7. In a vehicle having an engine, a vehicle structure and a damper suspending said engine on said vehicle structure, the improvement comprising said damper having
    a first armature fixedly connected to said engine;
    a second armature fixedly connected to said vehicle structure;
    an elastic block having one end fixedly attached to said first armature and the opposite end fixedly attached to the second armature;
    said elastic block and said first and second armatures defining a bore extending from said one end of said elastic block to said opposite end thereof;
    a working fluid contained within said bore;
    a partition plate fixed to said second armature and projecting inwardly into said bore toward said one end of said elastic block to divide said bore into a first chamber between said partition plate and said one end of said elastic block and a second chamber between said partition plate and said opposite end of said elastic block;
    said partition plate having means defining an orifice providing a restricted flow communication between said first and second chambers; and
    a valve including at least one valve hole formed through said partition plate, said valve having a first valve seat fixedly attached to one side of said partition plate and enclosing said at least one valve hole and a second valve seat attached to the opposite side of said partition plate and enclosing said at least one hole, said valve having a first pressure responsive valve plate disposed within said first chamber and cooperating with said first valve seat and a second pressure responsive valve plate disposed within said second chamber and cooperating with said second valve seat, said first plate being normally disengaged from said first valve seat and being engaged with said first valve seat when the pressure in said working fluid contained within said first chamber is higher than the pressure in said working fluid contained within said second chamber by a predetermined amount, said second valve plate being normally disengaged from said second valve seat and being engaged with said second valve seat when the pressure in said working fluid contained within said second chamber is higher than the pressure in said working fluid contained in said first chamber by a predetermined amount.

8. In a vehicle as claimed in claim 7, wherein said orifice means is in the form of an orifice tube fixedly attached to said partition plate to extend therethrough, said first and second valve plates being axially slidably mounted on said orifice tube, said valve including means for holding said valve plates at a distance spaced from the cooperating valve seats.

9. In a vehicle as claimed in claim 8, wherein said first and second valve plates are made of an elastic material and fixed to said orifice tube, each at a position axially spaced a distance from the cooperating one of said first and second valve seats.

10. In a vehicle as claimed in claim 7, wherein said orifice defining means is in the form of an orifice, and wherein said first and second valve plates are resiliently supported by elastomers fixedly mounted on said partition plate in a manner to surround said orifice, said valve plates having central apertures, respectively, opening into the interior of said elastomers to communicate with said orifice formed through said partition plate, said valve seats being formed with concave grooves, respectively, said valve plates having their rims curved toward said cooperating valve seats and received by said corresponding concave grooves.

11. In a vehicle as claimed in claim 7, wherein said orifice defining means is in the form of an orifice tube axially slidably mounted on said partition plate and wherein said valve plates are fixed to said orifice tube and resiliently supported by an elastomer fixedly mounted on said partition plate.

12. A damper in particular for suspension of an engine, comprising:
a plurality of armatures one of which is for connection to an engine, while the other one being for connection to a vehicle structure;
an elastic block interposed between said armatures;
said elastic block and said armatures defining a bore which is filled with a working fluid;
a partition plate fixed to one of said armatures to divide said bore into two chambers;
means defining at least one hole providing communication between said two chambers;
means defining an orifice providing a restricted flow communication between said two chambers; and
valve means for closing said hole in response to a difference between a pressure in the working fluid in one of said two chambers and a pressure in the working fluid in the other one of said two chambers exceeding a predetermined value,
wherein said orifice defining means comprises an orifice in said partition plate, and wherein said valve means comprises two valve seats fixedly attached to the opposite surfaces of said partition plate in a manner to surround said hole means, two thin valve plates resiliently supported by elastomers fixedly mounted on said partition plate in a manner to surround said orifice, said thin valve plates having a central aperture, respectively, opening into the interior of said elastomers to communicate with said orifice formed through said partition plate, said valve seats being formed with concave grooves, respectively, said thin valve plates having their rim curved toward said respective valve seats and received by said respective concave grooves.

* * * * *